United States Patent [19]

Aleksoff et al.

[11] Patent Number: 5,040,135

[45] Date of Patent: Aug. 13, 1991

[54] METHOD OF FRINGE-FREEZING OF IMAGES IN HYBRID-OPTICAL INTERFEROMETRIC PROCESSORS

[75] Inventors: Carl C. Aleksoff; Nikola S. Subotic, both of Ann Arbor, Mich.; Nickolas P. Vlannes, Troy, N.Y.

[73] Assignee: Environmental Research Institute of Michigan, Ann Arbor, Mich.

[21] Appl. No.: 356,008

[22] Filed: May 23, 1989

Related U.S. Application Data

[63] Continuation-in-part of Ser. No. 91,480, Aug. 31, 1987, Pat. No. 4,847,796.

[51] Int. Cl.[5] .......................... G06J 1/00; G06G 9/00; G02F 1/11

[52] U.S. Cl. .................................... 364/602; 364/822; 359/287; 359/559

[58] Field of Search ............... 364/602, 604, 606, 822, 364/841, 845, 807, 800; 350/96.11, 96.12, 96.13, 96.14, 162.11, 162.12, 162.13, 162.14, 353, 358; 356/345

[56] References Cited

U.S. PATENT DOCUMENTS

| | | | |
|---|---|---|---|
| 4,468,093 | 8/1984 | Brown | 364/822 X |
| 4,531,196 | 7/1985 | Lin | 364/822 X |
| 4,567,569 | 1/1986 | Caulfield et al. | 364/845 |
| 4,670,854 | 1/1987 | Mossberg et al. | 364/822 |
| 4,686,647 | 8/1987 | Soffer et al. | 364/850 |
| 4,847,796 | 7/1989 | Aleksoff et al. | 364/602 |

*Primary Examiner*—Joseph Ruggiero
*Attorney, Agent, or Firm*—Krass & Young

[57] ABSTRACT

The invention is a method for obtaining fringe visibility in hybrid-optical interferometric processors. Encoded data defining an image is utilized to provide both a timing input signal and a method of modulating a light source in synchronization with the modulation of an optical-acoustical element. The modulated light is then detected in a receptor array and converted into signals suitable for driving a readable, visual-imaging device or other devices for image analysis.

7 Claims, 5 Drawing Sheets

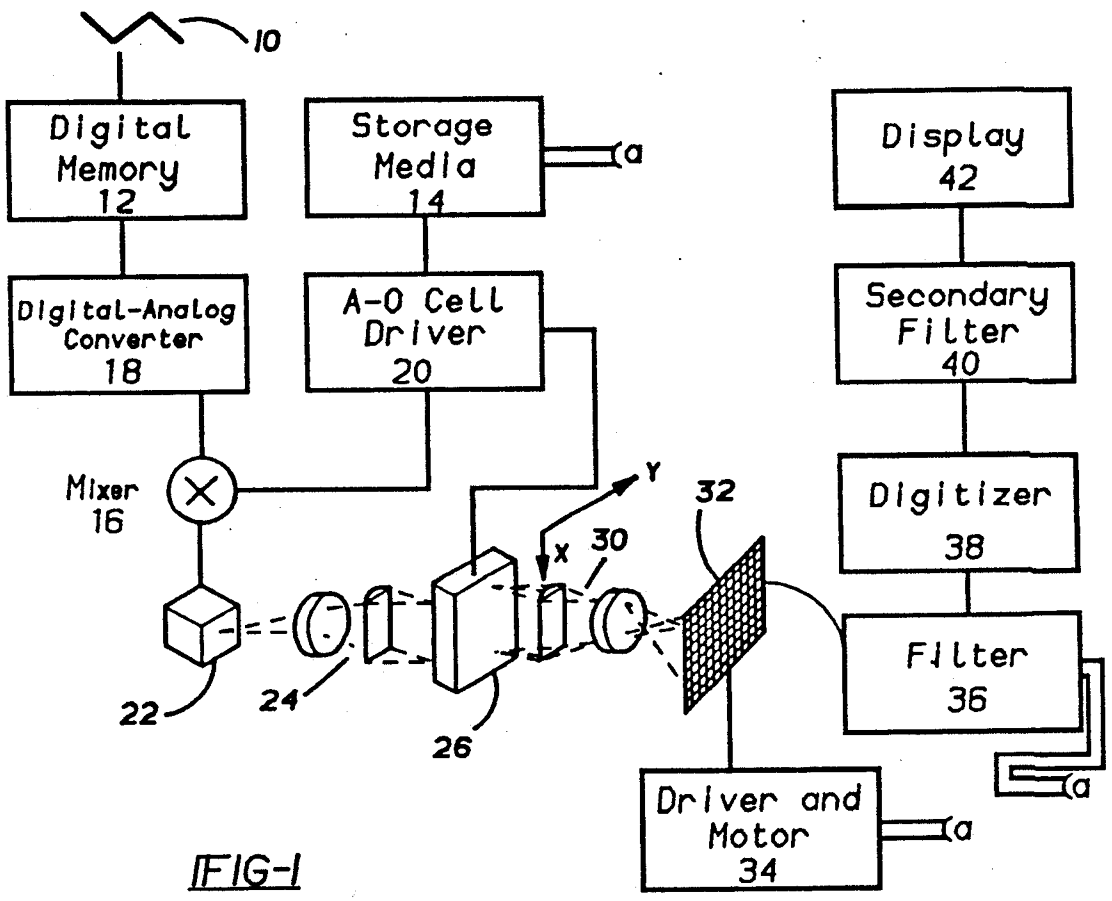
IFIG-1
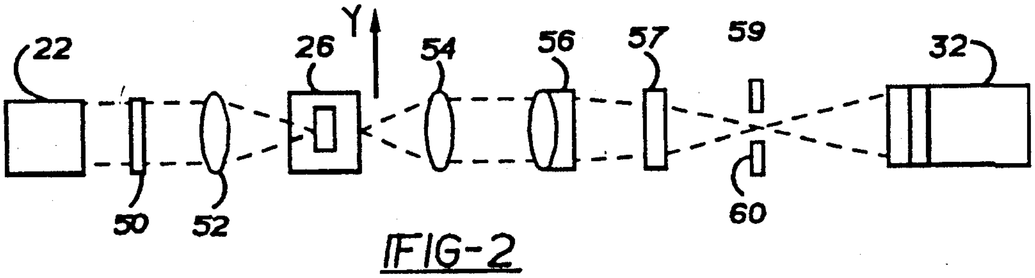
IFIG-2
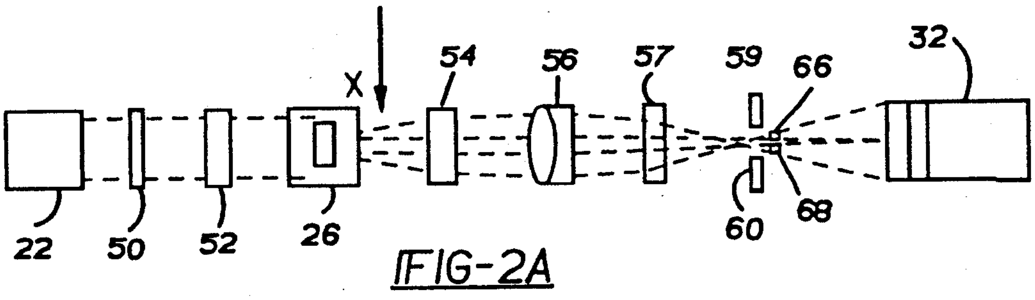
IFIG-2A

METHOD OF FRINGE-FREEZING OF IMAGES IN HYBRID-OPTICAL INTERFEROMETRIC PROCESSORS

CROSS REFERENCE TO RELATED APPLICATION

This is a continuation-in-part of U.S. patent application Ser. No. 091,480, now U.S. Pat. No. 4,847,796.

FIELD OF THE INVENTION

The invention pertains generally to methods and apparatus for improving fringe visibility in optical-electronic-digital signal processing systems, and more particularly to methods of modulating light utilizing diode lasers, acousto-optic cells, and detecting the modulated light using time integrating solid-state array detectors to accomplish improved signal processing capabilities utilizing fringe freezing techniques.

BACKGROUND OF THE INVENTION

In interpretation of signals received from a wide variety of receptors, (e.g., television cameras, x-ray scanning devices, radar), it is desirable to process the signals in such a manner as to produce a processed and filtered image capable of representation in a more specifically usable form, for example, as a visible display on a conventional video display terminal. It is also desirable to precisely control the properties of individual aspects of the displayed image. These systems, referred to as hybrid-optical systems have the potential to gain an important role in signal processing due to their compactness, efficiency and high information rate of processing. Recently, high power, single-mode diode laser systems have become available enabling the useful operation of a certain class of hybrid-optical interferometric processors. In this type of processor, the diffracted and undiffracted orders of an acousto-optic cell are interfered. Due to the relative Doppler frequency shift between the orders, the interference fringes are modulated at the Doppler frequency. This typically would cause the destruction of fringe visibility when observed with time integrating detectors such as television cameras.

Restoration of the fringe visibility can be achieved by shifting in frequency one of the two orders of the light from the acousto-optic cell. For example, a second acousto-optic cell may be utilized and modulated at the same frequency as the original. However, this solution is not particularly desirable, due to the additional signal processing circuitry, acousto-optic cell, and associated optics which make this methodology unduly complex.

Any laser may be utilized with external modulation sources. However, because of their bulk, high cost, and necessity for external modulation continuous wave gas lasers are not well suited to compact installations. Similar limitations apply to other types of lasers, for example dye lasers and optically pumped solid state crystalline or glass lasers. Such lasers may also be utilized with external modulation sources. In contrast, solid state diode lasers offer the benefit of direct modulation, compact size and ruggedness.

The present invention overcomes these shortcomings and provides a lower cost, rugged, compact and simplified method of improving fringe visibility.

BRIEF DESCRIPTION OF THE DRAWINGS

These and other features of the present invention will be made clear from the following description, taken in conjunction with the Figures, in which:

FIG. 1 is a composite perspective view and block diagram of the individual components of the invention depicting the signal and light paths;

FIG. 2 is a top view of the optical arrangement of the invention, and FIG. 2A is a side view of the same arrangement showing the relative positions of the diffracted and undiffracted spots;

DESCRIPTION OF THE PREFERRED EMBODIMENT

Figure 3:
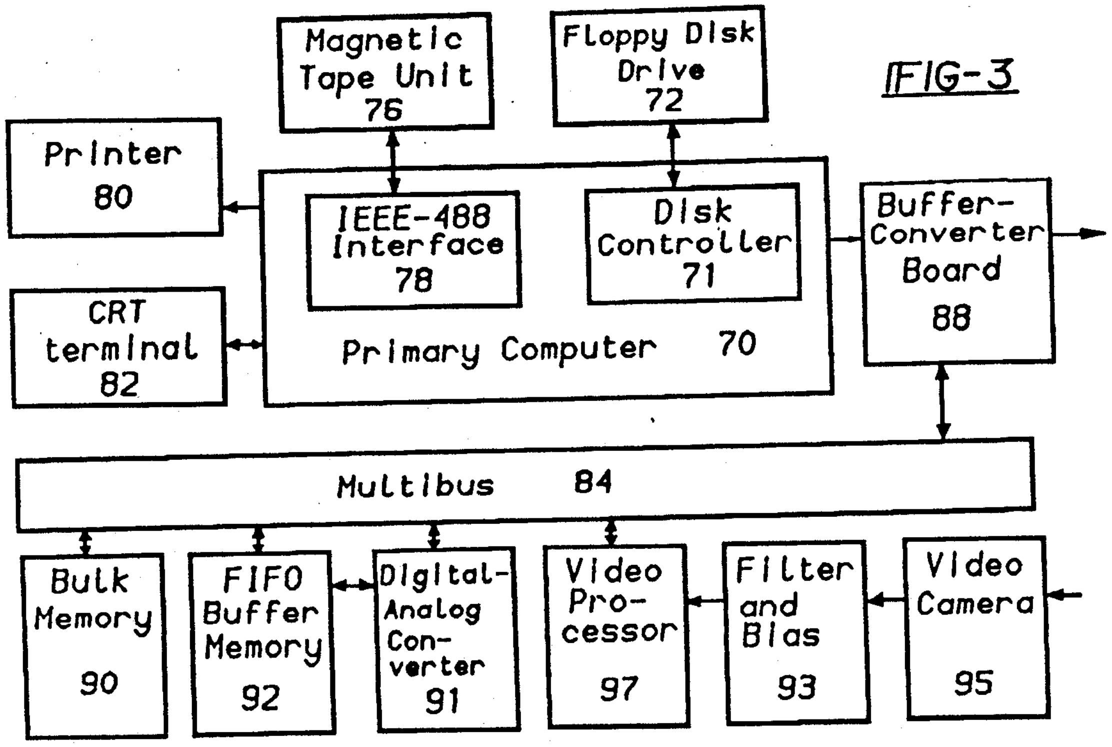
FIG. 3 is a block diagram of the computer system.

Referring now to FIG. 1, image input signal data 10 is stored in a digital memory 12 where it is read out at a specified rate. The data may be digitized and stored in a variety of computer-compatible media, such as computer tapes or disks. Digital data is preferably converted to analog format, however, the data can likewise be obtained in analog form and fed directly to the remaining components in the system.

After the digital-analog converter 18, the input signal is a real (non-negative) analog signal that is used to intensity modulate the diode laser 22. A multiplying signal is derived from the A-O (Acoustic-Optic) cell driver as part of the fringe-freezing technique and will be described herein. The analog signal from digital-analog converter 18 is multiplied by the multiplying signal from A-O cell driver 20 in mixer 16, the product is supplied to modulate diode laser 22. After passing through primary optics 24 the modulated light illuminates the A-O cell 26 driven by a linear frequency-modulated (FM) sweep signal that is in synchronism with each input line of data. The A-O cell 26 produces a diffracted beam that scans linearly with the FM sweep. The undiffracted beam is also allowed to pass and is of equal intensity to the diffracted beam. Secondary optics 30 image in the x-direction (acoustic wave propagation direction) the plane of the A-O scanner to the detector array while in the y-direction the light is spread (i.e. produces a back projection of the light). In the preferred embodiment, data are presented in polar format, derived from directional data based on the method of acquisition, for example, the position of the receiving sensor in computer axial tomography. The detector array 32 rotates through an arc to establish the proper polar angle and center point for each item of data. The two beams from the A-O cell 26 will interfere at the detector array 32 to produce the two-dimensional cosine transform (with respect to the detector coordinates) of the instantaneous (spatial) signal inserted via the diode laser.

Referring now to FIGS. 2 and 2A, this process might be better understood by considering the signal in the pseudo input plane 66. The two beams from the A-O scanner are focused in this plane. The spot due to the diffracted beam moves linearly in the x-direction while the spot due to the undiffracted beam remains stationary at the center of the optical system. If we view these points from the perspective of the rotating detector array then the moving spot traces out the polar formatted phase history geometry while the stationary spot is at the center of the polar lines. Both spots are intensity modulated according to the input signal and hence a pseudo input is plotted out in that plane. The detector array lies in the Fourier transform (FT) plane of the pseudo input signal plane. That is, the light from the two spots diverge out and interfere to form a fringe pattern at the detector array that is the 2D cosine transform of the instantaneous input signal sample. The integration of all the fringe patterns as seen by the rotating detector array produces the desired image.

Ideally, the detector array could (incoherently) integrate all the transforms of the input signal samples until the final image is generated. However, due to practical dynamic range limitations of the detectors the integration is also partially done in a digital processor memory. That is, the detector array is part of a standard commercial video camera that reads out all the detectors in a standard frame time. It takes a number of frames to process all the data. Each frame of data from the camera, after appropriate filtering is digitized and summed, pixel-by-pixel, into the digital processor memory. Thus, the combination of the detector array and digital memory acts as a large dynamic range detector array.

Returning to the discussion of the optical process it is noted that its operation depends on the interference of the zero-order (i.e., non-diffracted order) beam with the first-order diffracted beam. The interference fringes produced by using CW light are moving ones since the frequency of the first-order beam is (Doppler) shifted by the acoustic wave. Integration of these fast moving fringes by the slow framing detectors would completely wash out the fringes. Hence the technique of fringe freezing is used. This technique can be considered to be similar to strobing a rotating object in order to make the object appear stationary. As indicated in FIG. 1 the fringe freeze signal is generated by intensity modulating (pulsing) the laser source at the same frequency as that of the A-O scanner by mixing the A-O scanner frequency with that of the main pulse history signal.

The computer complex used in the experiment is schematically illustrated in FIG. 3. The complex is built around a multibus interface system using various circuit cards configured to provide the desired functions. The primary computer 70 is single card Motorola 68000 chip computer with the usual I/0 devices: Floppy disks 72, CRT terminal 82, printer 80 and a magnetic tape 76 input via a IEEE-488 interface 78. The bulk memory 90 is a set of multibus boards with three megabytes of storage. The data can be loaded from computer compatible tapes to this memory. Alternatively, the computer can internally generate test signals that are loaded into this memory. The signals consisted of 8 bit samples.

The input data are preferably read out of memory in a DMA (direct memory access) mode to a buffer-converter board 88 which provides analog signals at the proper rate to feed the diode laser. Data stored in the bulk memory passes over the multibus 84 at non-uniform rates due to bulk memory refresh requirements. Two FIFO (first in, first out) buffer memories on the converter board 88 accept the data in a ping-pong mode at non-uniform rates and read it out to a D/A converter at appropriate uniform rates. The rate at which data are read out and the number of samples are programmed from the computer. The sample clock rate can be controlled externally or run from the computer clock. A trigger signal to start the rotation of the detector array 32 as well as a signal to start the sweep for the A-O scanner are also supplied by the computer. The time delay between the start of the data output and the strobe is also programmable.

The other part of the computer complex operates with the received signal from the optical processor. The video signal from the detector array 32 is filtered, a bias inserted and is then sent to the video processor which consists of a set of commercial available multibus cards 91, 92 and 97 under control of the computer. The image processor's operations generally include digitization and storage of television frames, processing of data at video rates, and the display of stored data.

Figure 4:
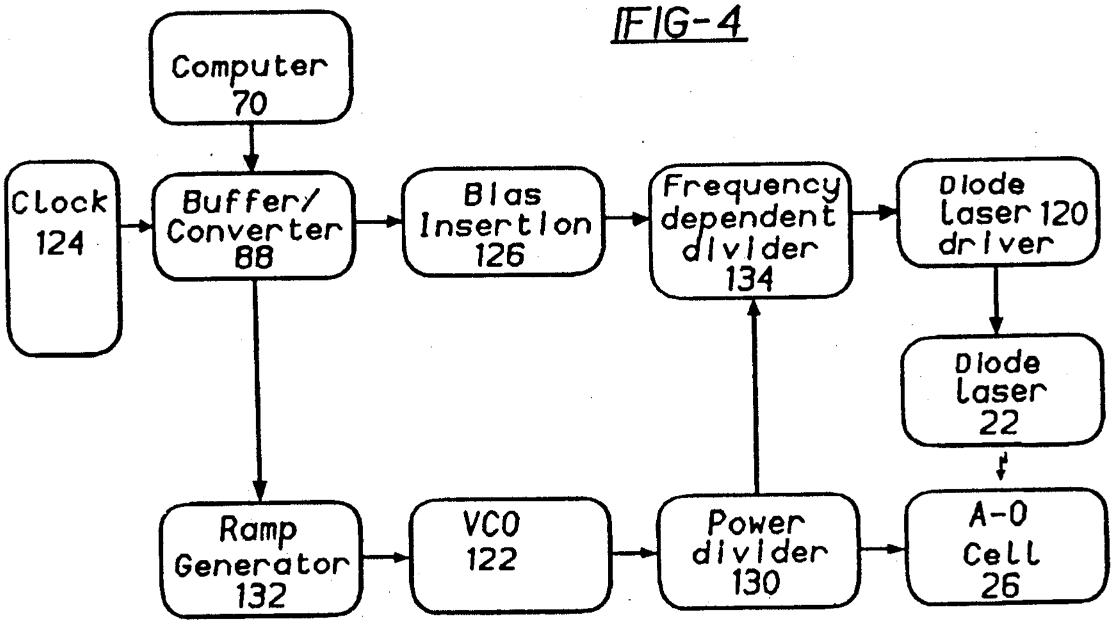
FIG. 4 is a block diagram of the diode and A-O cell scan driver circuits.

FIG. 4 shows the "front-end" electronics in more detail. Primary computer 70 supplies data to buffer/-converter board 88 whose timing in controlled by clock 124. The analog output from the buffer/converter board 88 is first put on a bias appropriate for the diode laser driver 120 by bias insertion circuit 126. This biased phase history signal is combined with a portion of the FM sweep that drives the A-O cell 26 in frequency dependent divider circuit 134 to produce the composite signal that actually feeds the diode laser driver 120. Diode laser driver 120 modulates the output of diode laser 22. The FM sweep signal is obtained by driving a voltage controlled oscillator 122 with a ramp generator 132 that is triggered with the strobe signal from the buffer/converter board 88. The input signal is a relatively low frequency signal of less than 50 kHz while the FM sweep can range from 30 to 60 MHz. Power divider 130 supplies a portion of the power to A-O cell 26 and a portion to frequency dependent divider circuit 134. A-O cell 26 also receives the optical signal from diode laser 22 in a manner more fully illustrated in FIG. 1.

Figure 5A:
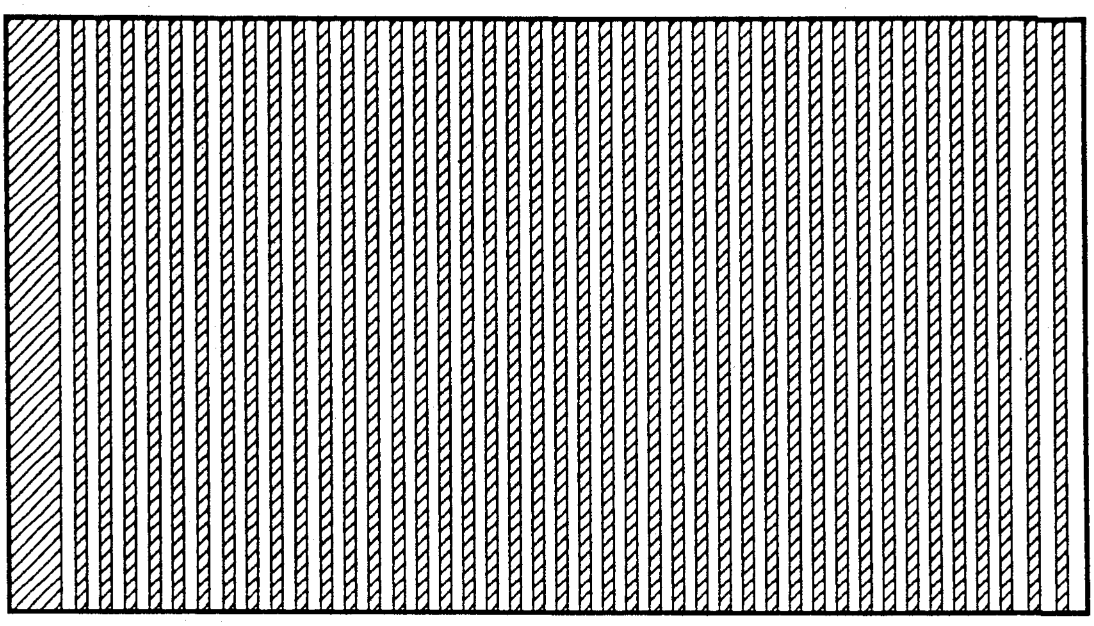
FIG. 5A is an example monitor screen image formed of constant input data and a constant frequency drive to the acousto-optic scanner.
Figure 5B:
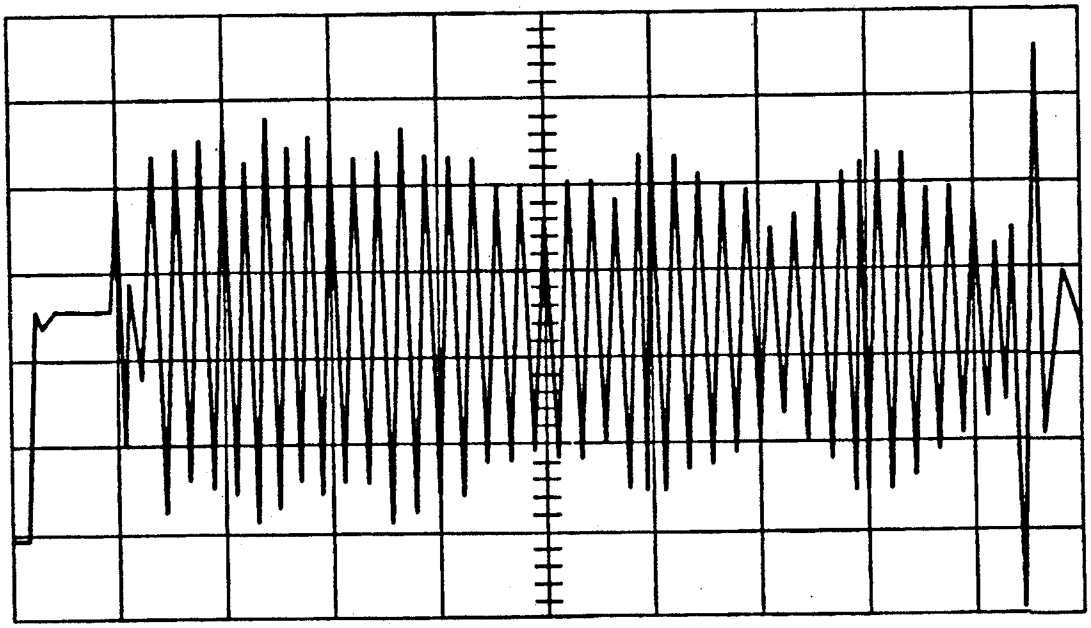
FIG. 5B is an oscilloscope trace of a single TV line corresponding to the example of FIG. 5A.
Figure 5C:
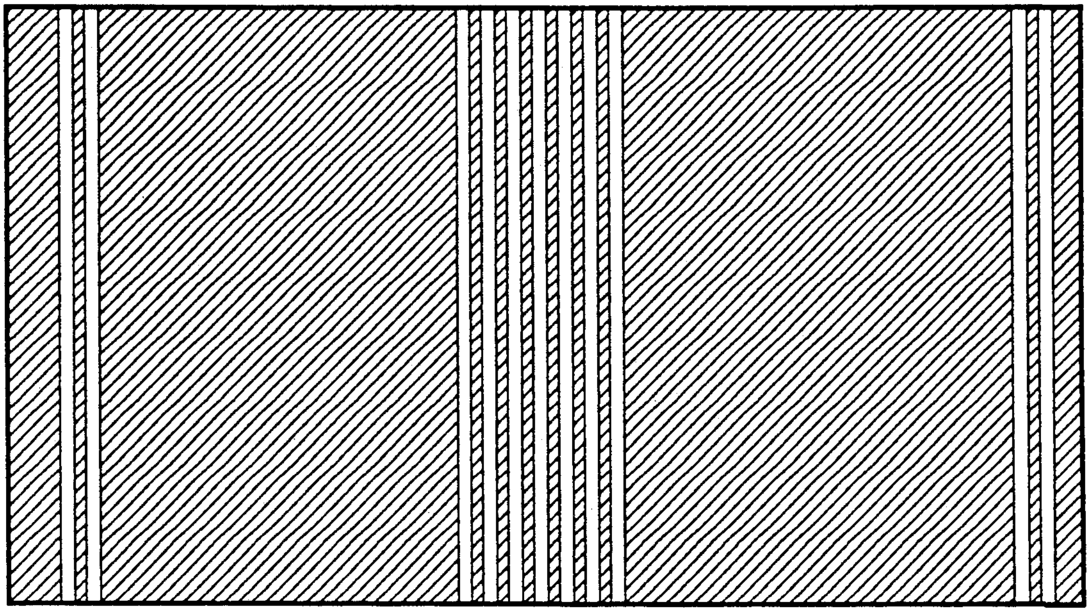
FIG. 5C is an example monitor screen image formed of square wave input data and a linearly scanning frequency drive to the acoustic-optic scanner.
Figure 5D:
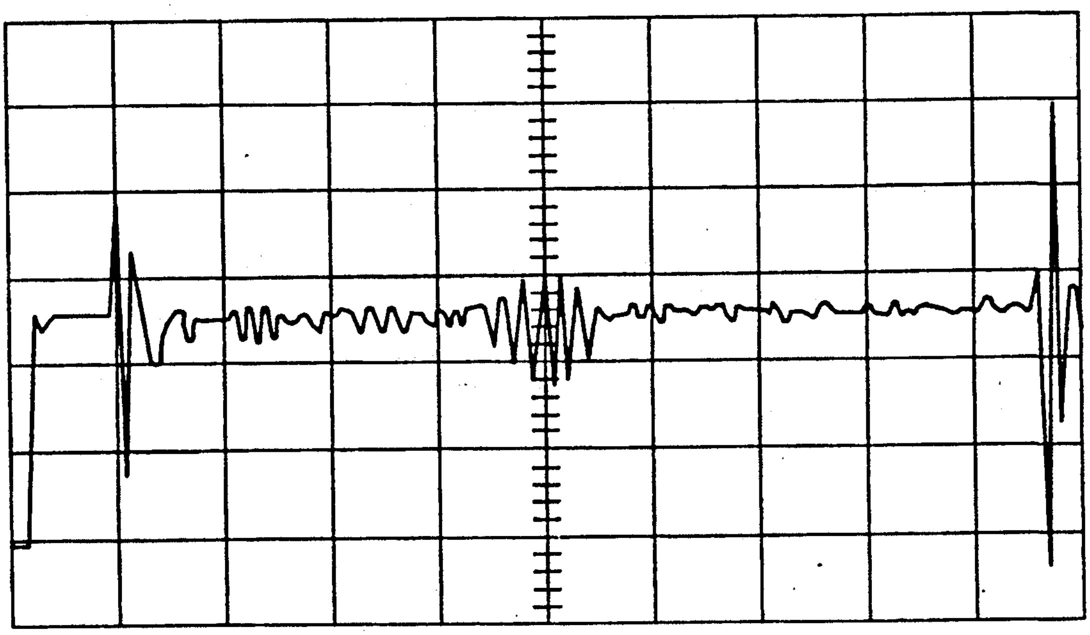
FIG. 5D is an oscilloscope trace of a single TV line corresponding to the example of FIG. 5C.

By way of example, FIG. 5(B) shows an oscilloscope trace of a single TV line of display. The data from which this line is derived is of constant value, and the acousto-optic scanner output is based on an input to the acousto-optic scanner in the form of a constant wave frequency. By comparison, FIG. 5(D) is an oscilloscope trace of one line of a TV display where the data is a square wave signal, and the acousto-optic scanner is linearly scanning. It can be seen that the sinc function envelope on a carrier was obtained as expected for the cosine transform of the square wave. On a visual monitor, the screen image represented by the oscilloscope trace shown in FIG. 5(B) would be in the appearance of a series of evenly spaced vertical bars across the face of the screen as shown in FIG. 5(A). The monitor output represented by the trace in 5(D) would present a group of well defined vertical bars at the center of the screen as shown in FIG. 5(C).

FIG. 2 shows the actual optical arrangement used in one embodiment of the invention. The source is a commercially available diode laser 22 system emitting up to 40 mW of single mode CW light at 820 nm. The light is collimated by the internal optics of the diode laser system.

Consider the top view first, FIG. 2. Lens 52 converges the light to a line along the A-O cell 26. The diffracted beam and the undiffracted beam are then collimated by lens 54. Lens 56 spreads the light across the detector array 32 to carry out the back projection operation.

Consider the side view next, FIG. 2A. Lenses 52 and 54 have no significant effect on this dimension. The collimated light entering the A-O cell 26 is split into a diffracted beam 66 and the undiffracted beam 68. Lens 56 images the plane of the A-O cell 26 onto the detector array 32 with a magnification of about 6.3.

The light is focused into two spots at plane 59, which is labeled the pseudo phase history plane and at which a spatial filter 60 is placed to remove any higher order diffraction from the A-O cell 26. The light from the diode laser is linearly polarized. The quarter wave plate 50 rotator produces circularly polarized light which is required for optimum diffraction efficiency from the A-O cell 26. The A-O scanner uses an acousto shear wave in the birefringent crystal ($TiO_2$) for its operation. However, the light is elliptically polarized in the opposite sense for the two beams exiting the A-O scanner. In order to guarantee optimum fringe visibility at detector array 32 a linear polarizer 57 is oriented to give equal energy in both beams at the detector array, as well as to produce a common linear polarization.

With reference again to FIG. 1, the detector array 32 is mounted on a rotary head driven by a microstep motor and computer controllable driver 34. However, the driver 25 may be set up manually and use only the trigger from the computer to start its rotation. The rotation is typically continuous during the processing.

Let us now consider the output electronics. The detector array 32 is a CCD image sensor (488 vertical detectors by 380 horizontal detectors) built into a camera and includes a fiber optic input faceplate. The output of the camera is preferably in a standard RS170 television format, 30 frame per second and interlaced lines.

The signal from the camera includes a large bias with respect to the signal that is to be retrieved. Hence the signal is sent through a filter 36 to remove the bias. The filter is actually composed of two filters. The first filter is a low pass filter with a cut off frequency of 4.2 MHz which removes various clocking noises. The second filter is a one stage transversal filter (i.e. a differencing circuit with a time delay of 142 nsec) which removes the bias and discriminates against lower frequencies. A new optimum bias is inserted on the filtered signal so that it can be properly digitized as a positive signal.

The digitizer 38 operates at a 10 MHz sample rate with 8 bits of resolution and produced a 512×512 pixel frame. Each frame of data is similarly digitized and the new pixel values are added to the previous pixels values. Also, a constant signal that is the same as the average signal for the input line of data is run through the whole process and the resulting frames are subtracted from the memory. This latter subtraction removes the inserted bias, fixed detector patterns noise, and other fixed optical spatial noises.

The image in the memory is on a spatial carrier which is removed by a secondary filter 40 before displaying the image. The image signal on its way to the display is first rectified by a look-up table and then converted into an analog signal with the image processor before it is low pass filtered externally with a 1 MHz cut-off frequency to produce the magnitude image.

A better understanding of the fringe visibility function and its derivation can be seen from the following formulae. With general reference to FIG. 1, showing a generalized signal flow diagram of the type of interferometric processor architecture, a point source described by the quasi monochromatic analytic time function:

$$S(t) = U(t)e^{+2\pi i\nu_0 t}$$
$$= M(t)e^{+2\pi i\nu_0 t+\alpha(t)}$$

is split into two waves, each of which is frequency translated (e.g. via an acousto-optic cell), and then recombined as plane waves to give the instantaneous intensity:

$$I(t,\bar{r}) = |A_1S(t-t_1)e^{i[2\pi\nu_1(t-\tau_1)+\phi_1-\bar{k}_1.\bar{r}]}+A_2S(t-t_2)e^{i[2\pi\nu_2(t-\tau_2)+\phi_2-\bar{k}_2.\bar{r}]}|^2$$

where

S(t) is the field strength of the source, t is time,

U(t) is the analytic amplitude, $\nu_O$ is the optical carrier of the source, $M(t)=|S(t)|=U(t)$ is the magnitude of the source, $\alpha(t)$ is the phase of the source, $A_j$ is the fraction of magnitude of the source in the j-th beam, with $A_1^2+A_2^2=1$ assumed, $\nu_j$ is the frequency offset from $\nu_O$ in the j-th beam, $\phi_j$ is the insertion phase for the j-th beam, $\bar{k}_j$ is the wave vector for the j-th beam, with $$k_j = |\bar{k}_j| = \frac{2\pi}{\lambda_j} = \frac{2\pi(\nu_0+\nu_i)}{c},$$

$\nu_j$ is the wavelength for the j-th beam, $\bar{r}$ is the position vector in the output source, $\tau_j$ is the time delay from the j-th frequency modulation to the output origin, and $t_j$ is the time delay from the source to the output origin along the j-th path.

The instantaneous intensity can be written as:

$$I(t,\bar{r}) = I_{11}(t)+I_{22}(t)+I_{12}(t)+I_{21}(t)$$

where $$I_{11}(t)=A_1^2|U(t-t_1)|^2+A_1^2M^2(t-t_1)$$

$$I_{22}(t)=A_2^2|U(t-t_2)|^2+A_2^2M^2(t-t_2)$$

$$I_{12}(t)=A_1A_2U^*(t-t_1)U(t-t_2)e^{(2\pi i\Delta\nu t+i\beta)}$$

$$I_{21}(t)=A_1A_2U(t-t_1)U^*(t-t_2)e^{(-2\pi i\Delta\nu t-i\beta)}$$

where $$\Delta\nu=\nu_1-\nu_2 \text{ and}$$

$$\beta=\phi_2-\phi_1-(\bar{k}_2-\bar{k}_1).\bar{r}-2\pi(\nu_2\tau_2-\nu_1\tau_1)-2\pi\nu_O(t_2-t_1)$$

The "instantaneous" intensity spectrum is defined as the Fourier transform of the instantaneous intensity and is given by:

$$i(f,\bar{r})=A_1^2\chi_{11}(f)+A_2^2\chi_{22}(f)+A_1A_2\chi_{12}(f+\Delta\nu)e^{i\beta}+A_1A_2\chi_{21}(f-\Delta\nu)e^{-i\beta},$$

where $$i(f,\bar{r}) = \int I(t,\bar{r})e^{-2\pi ift}\,dt$$
$$\equiv F_t[I(t,\bar{r})]$$

and $$\chi_{mn}(\bar{f}) = F_t[U^*(t-t_m)U(t-t_n)]$$
$$= [u^*(f)e^{+2\pi itmf}] \cdot [u(f)e^{-2\pi itnf}]$$

Here $\cdot$ represents the cross correlation $$a^*(f) \cdot b(f) = \int a^*(f')b(f'+f)df'$$

Note that $\chi_{21}(f)=\chi_{12}^*(-f)$.

An ideal point detector with infinite integration will see the signal:

$$I(r) = \int_{\infty}^{\infty} I(t,r)dt$$
$$= i(0,\bar{r})$$
$$= (A_1^2 + A_2^2)\chi_{11}(0)$$
$$+ 2A_1A_2|\chi_{12}(\Delta\nu)|\cos[\beta + \xi(\Delta\nu)]$$

where $\xi(f)$ is the phase of $\chi_{12}(f)$, i.e.

$$\chi_{12}(f)=|\chi_{12}(f)|e^{i\xi(f)}$$

Here the visibility can be described by $$\nu = \frac{\text{Max } I(r) - \text{Min } I(r)}{\text{Max } I(r) + \text{Min } I(r)}$$
$$= \nu_0\nu_m$$

where $$\nu_0 = \frac{2A_1A_2}{A_1^2A_2^2}$$

and $$\nu_m = \frac{|\chi_{12}(\Delta\nu)|}{\chi_{11}(0)}$$

The effect of the source on the fringe visibility is described by $\upsilon_m$. We note that $0 \leqq \upsilon_m \leqq 1$.

The special case where $t_1=t_2$ gives that $\chi_{12}(f)=\chi_{11}(f)$ which is the Fourier transform of the source intensity only, i.e. the phase variations of the source can be ignored.

We also note that if we let $t_1=-t_2=\tau/2$, then $\upsilon_m=|\chi(\Delta\upsilon,\tau)$ is the normalized ambiguity function.

It can be seen, therefore, that by appropriate modulation of the source waveform, fringe freezing is obtained in interferometric systems where a temporal frequency mismatch occurs between the two waves. It is accordingly possible to devise optical system architectures to remove the undesirable interference between multiple diffracted orders which are produced by acousto-optic cells, by the use of a relatively simple architecture. The invention herein described utilizes optics which are simple and operate primarily in the imaging mode and which are readily available, in contrast to Fourier transforming lenses which are not readily available and are very expensive. Likewise, the present optical design has the potential to be made very compact. Since the front end of the system is a single dimension processor, it is possible to place many of the components on a planar integrated optics chip. The processor is also a spatial single side-band type of system, wherein almost all of the light forms the desired image and there is no conjugate image to drain significant portions of the energy away. Both the diffracted and non-diffracted beams of the acousto-optic cell are used, and it is the acousto-optic cell itself that acts as a beam splitter for the interferometric operation of the system. Further, the interferometer is achromatic, and hence does not require a coherent source. The diode laser is desirable, however, because it is a high power source which can be directly modulated and is both small and efficient, thereby avoiding the requirement for an extra device to perform the modulation task. Finally, since the interferometer is also a near in-line type of interferometric architecture, it tends to be vibration-insensitive due to the fact that it can be easily constructed as a rigid mechanical system. An additional significant advantage of using this fringe freezing technique is the ability to control the phase of the fringes by controlling the time or phase of the source modulation with respect to the scanning. This phase control allows subtraction between common data frames to allow removal of bias and fixed noise.

Figure 6:
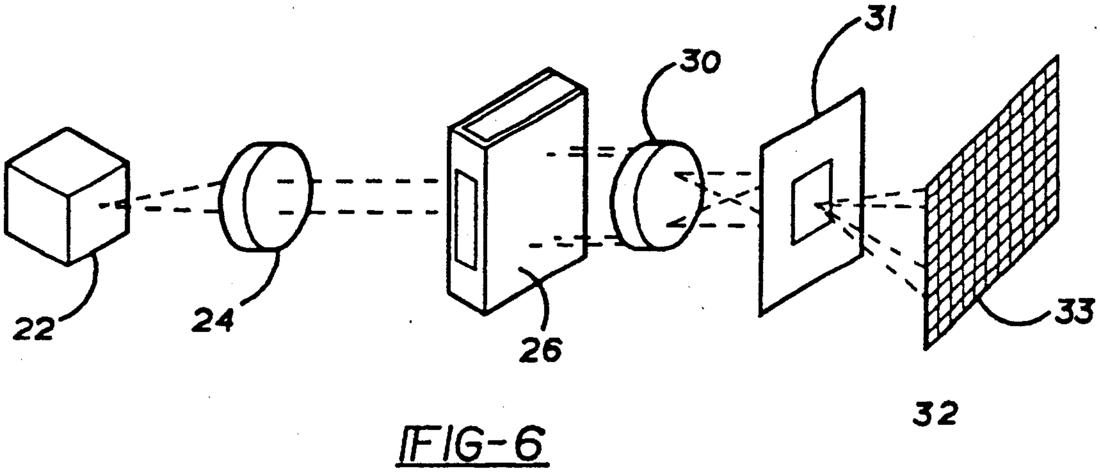
FIG. 6 is a stylized perspective view of an alternative embodiment.

Many triple product optical processor architectures can benefit from using the fringe freezing technique. FIG. 6 shows a unique simplified embodiment of a triple processor architecture made possible by the fringe freezing technique. This processor uses two orthogonally oriented acousto-optic cells 26 mounted on the same substrate. One source produces a light beam with x-axis motion and the other produces another light beam with y-axis motion. A diffracted order from one cell is interfered with a diffracted order of the other cell to produce the desired fringes. An imaging lens 30 is used to image the acoustic-optic cell plane to the detector 32. An aperture 31 in the Fourier transform plane 148 of the lens is used to block all but the desired two diffracted beams. The source modulation is now synchronized to the difference frequency between the two diffracted orders in order to freeze the fringes. Otherwise, the input signals to the source and the output processing of the detector signals are similar as in the first embodiment.

The advantage of this type of architecture is that it allows arbitrary orientation of the fringes (within the limits of the acousto-optic scanner ranges and offsets) without using mechanical devices to produce motion of the detector array as was required in the first embodiment illustrated in FIG. 1. Having thus described our invention, numerous obvious modifications may be made by those skilled in the art without deviating from the invention herein claimed which is:

What is claimed is:

1. An improved method for obtaining fringe visibility in hybrid-optical interferometric processors comprising:

A) transferring digitally-encoded data defining an image to a digital memory device;

B) storing said data for a specified time;

C) converting said data to analog format;

D) modulating an acousto-optic cell utilizing a frequency modulated linear sweep derived from said data;

E) combining into a composite signal said data in analog format with said linear frequency modulated sweep in synchronization but with arbitrary relative phase to and with said data;

F) modulating a light source with said composite signal;

G) directing the modulated output of said light source through a first series of lenses;

H) directing the light output from said first series of lenses through said modulated acousto-optic cell;

I) directing the output of said acousto-optic cell through a second series of lenses;

J) detecting the output of said second series of lenses; and

K) converting said detected output into signals suitable for driving a readable, visual imaging device.

2. The invention as described in claim 1, wherein said light source is a coherent light source.

3. The invention as described in claim 1, wherein said conversion of said detected output further comprises:

A) filtering said detected output;

B) converting said filtered output into digital form; and

C) digitally summing said output on a pixel-by-pixel basis.

4. An improved method for obtaining fringe visibility in hybrid-optical interferometric processors comprising:

A) transferring digitally-encoded data defining an image to a digital memory device;

B) storing said data for a specified time;

C) converting said data to analog format;

D) modulating an acousto-optic cell utilizing a frequency modulated linear sweep derived from said data;

E) combining into a composite signal said data in analog format with said linear frequency modulated sweep in synchronization but with arbitrary relative phase to and with said data;

F) modulating a light source with said composite signal;

G) directing the modulated output of said light source through a first series of lenses;

H) directing the light output from said first series of lenses through said modulated acousto-optic cell;

I) directing the output of said acousto-optic cell through a second series of lenses;

J) detecting the output of said second series of lenses;

K) converting said detected output into signals suitable for driving a readable, visual imaging device;

L) filtering said detected output;

M) converting said filtered output into digital form; and

N) digitally summing said output on a pixel-by-pixel basis.

5. The method of claim 4, wherein the signal for modulating said light source is first shifted in phase by 180 degrees, and wherein said resulting phase shifted signal is subtracted from said filtered output.

6. An improved method for obtaining fringe visibility in hybrid-optical interferometric processors comprising:

A) transferring digitally-encoded data defining an image to a digital memory device;

B) storing said data for a specified time;

C) converting said data to analog format;

D) modulating an acousto-optic cell utilizing a frequency modulated linear sweep derived from said data;

E) combining into a composite signal said data in analog format with said linear frequency modulated sweep in synchronization but with arbitrary relative phase to and with said data;

F) modulating a light source with said composite signal;

G) directing the modulated output of said coherent light source through a first series of lenses;

H) directing the light output from said first series of lenses through said modulated acousto-optic cell;

I) directing the output of said acousto-optic cell through a second series of lenses;

J) detecting the output of said second series of lenses on an array of receptors;

K) converting said detected output into signals suitable for driving a readable, visual imaging device; and L) utilizing said data to initiate rotation of said array synchronized with said data.

7. The invention of claim 6, which further comprises a second filtering means for filtering said detected output wherein said second filtering means remove any carrier signal embedded in said data.

* * * * *

UNITED STATES PATENT AND TRADEMARK OFFICE
CERTIFICATE OF CORRECTION

PATENT NO. : 5,040,135

DATED : August 13, 1991

INVENTOR(S) : Carl C. Aleksoff et al.

It is certified that error appears in the above-identified patent and that said Letters Patent is hereby corrected as shown below:

Column 2, line 23, "acoustic" should be --acousto--;

Column 7, line 15, "$a^*(f) \cdot b(f) = \int a^*(f')b(f' + f)df'$" should be -- $a^*(f) \bigstar b(f) = \int a^*(f')b(f'+f)\,dt'$ --;

Column 7, line 23, "$I(r) = \int_{\infty}^{\infty} I(t,r)dt$" should be -- $I(\bar{r}) = \int_{\infty}^{\infty} I(t,\bar{r})\,dt$ --;

Column 7, line 55, "$v_m = |\chi(\Delta v,\tau)$" should be -- $\mathcal{V}_m = |\chi(\Delta\mathcal{V},\tau)|$ where $(\Delta\mathcal{V},\tau)$ --.

Signed and Sealed this

Third Day of November, 1992

*Attest:*

DOUGLAS B. COMER

*Attesting Officer* *Acting Commissioner of Patents and Trademarks*